July 11, 1933.   H. L. TIGGES   1,917,616
MACHINE TOOL
Filed April 30, 1931   2 Sheets-Sheet 1

Herbert L. Tigges
Inventor

By

Attorney

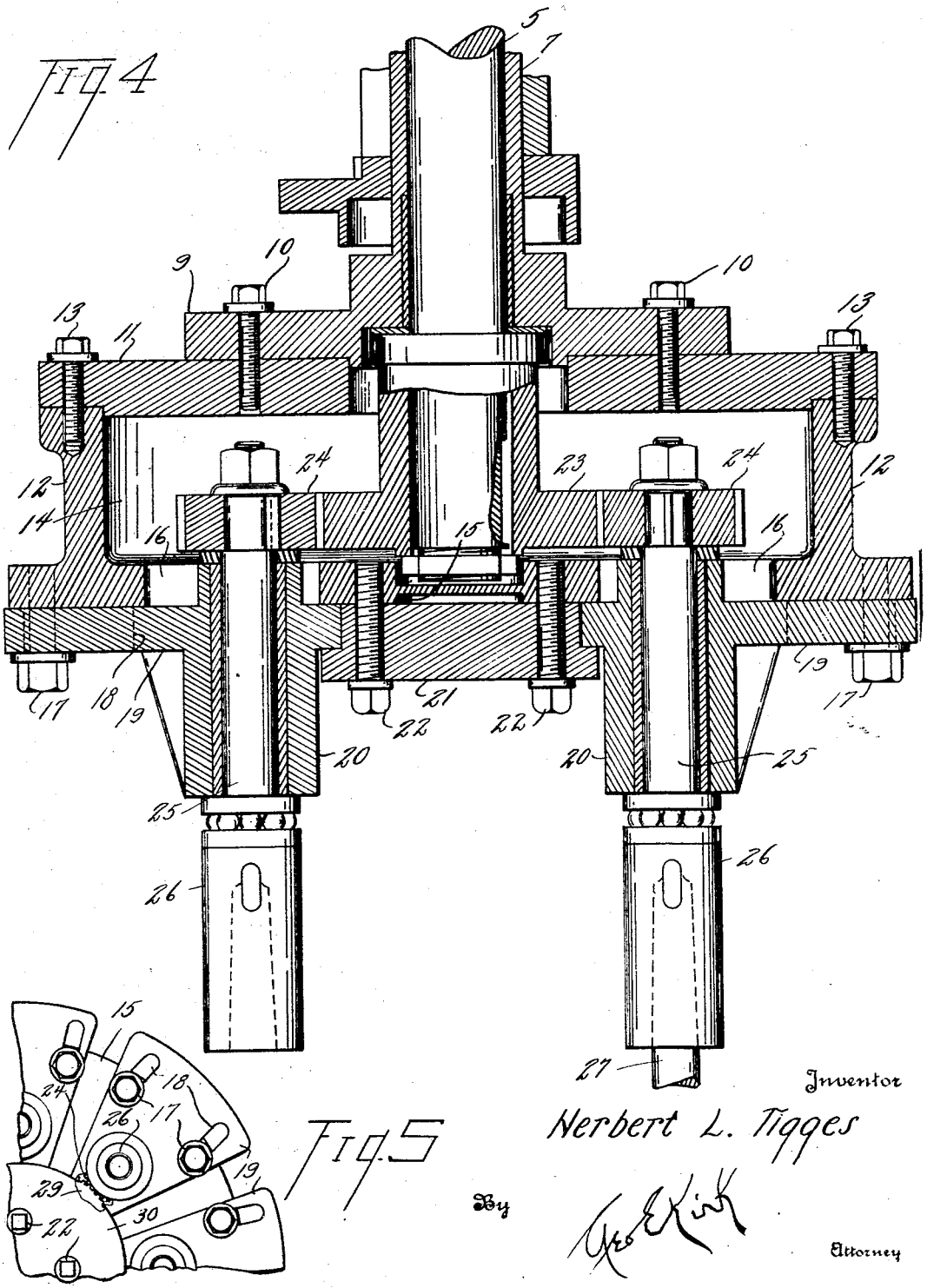

Patented July 11, 1933

1,917,616

UNITED STATES PATENT OFFICE

HERBERT L. TIGGES, OF TOLEDO, OHIO, ASSIGNOR TO BAKER BROTHERS, INC., OF TOLEDO, OHIO, A CORPORATION OF OHIO

MACHINE TOOL

Application filed April 30, 1931. Serial No. 533,979.

This invention relates to multiple toolholders.

This invention has utility when incorporated in power actuated machine tools wherein rotary holders are located in annular series readily adjustable to different radii.

Referring to the drawings:

Fig. 4 is an enlarged section through the spindle and holder assembly hereunder; and Fig. 5 is a fragmentary bottom plan showing the substitutive features in the variable radius adaptation hereunder.

Figure 1:
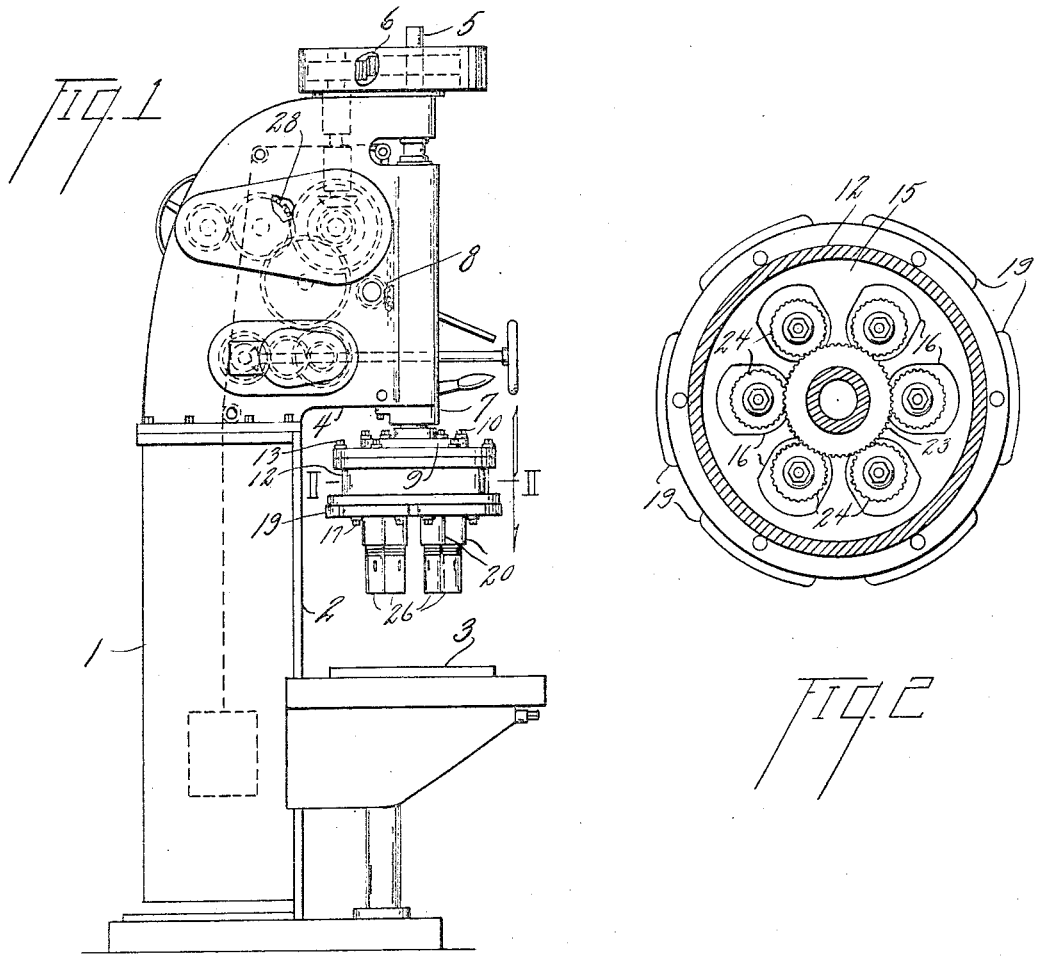
Fig. 1 is a side elevation, with parts broken away, of an embodiment of the invention in a machine tool of the drill press type.
Figure 2:
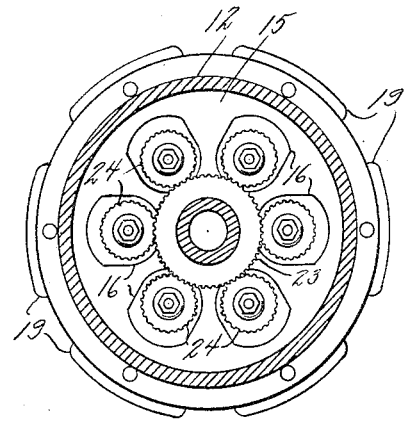
Fig. 2 is a section on the line II—II, Fig. 1, looking in the direction of the arrow.
Figure 3:
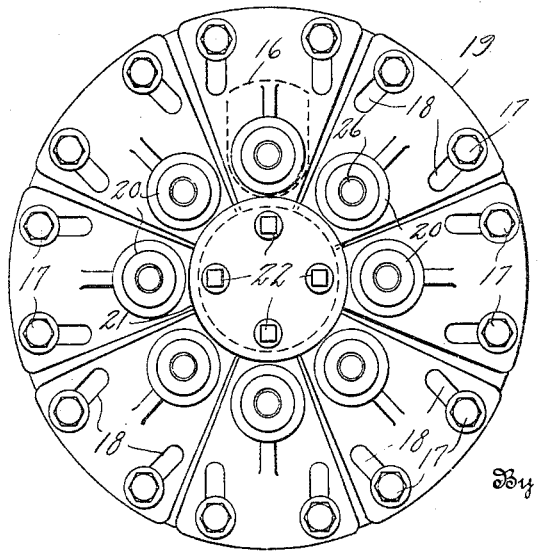
Fig. 3 is a bottom plan view of a holder of an accessory device hereunder having provision for eight holders instead of six shown in Fig. 1.

Machine tool column 1 is shown as having guide 2 for table 3 as a work holder. This column 1 has overhang 4 opposing the table 3. This overhang has spindle 5 given rotary motion by gearing 6. This spindle 5 is mounted in sleeve 7 in the overhang 4, which sleeve 7 has a control for reciprocatory motion by gearing 8. It is thus seen that the spindle 5 has rotary reciprocatory motion while the sleeve 7 thereabout is non-rotary and has reciprocatory motion. This sleeve terminates in flange 9 to which is connected, by bolts 10, housing or major flange 11. From this flange 11 there is shown depending coaxially extending flange 12 detachably connected to the flange 11 by bolts 13. This housing 11, 12, has therein chamber 14. The housing portion 12 extends inward to provide partition 15 having openings 16 therethrough.

Bolts 17 directly engaging this housing 12 extend through slots 18 in flanges 19 of holders 20. Additionally to these bolts 17 anchoring the flanges 19 on the outer region, medial substitutive plate 21 may engage the flanges 19 of these separate holders as this medial plate 21 is anchored by bolts 22 with the partition 15.

The spindle 5 has detachably connected therewith coaxial gear 23 directly in mesh with pinions 24 on auxiliary spindles 25 in the respective holders 20. These auxiliary spindles 25 terminate in socket portions 26 into which tools 27 may be inserted, which tools may be similar or dissimilar as may suit the particular piece of work under treatment.

In carrying out the invention hereof, there is shown a direct positive driving of the auxiliary spindles from the main spindle 5. This can be effected, notwithstanding the main spindle 5 may have driving gear for proper direction of rotation of a coaxial tool connected thereto. This end is attained due to gearing 28 in the drill press being reversible. There is thus a minimum of gearing with an effectiveness for heavy duty operation even at high speeds.

Furthermore, this tool is adaptable for varying the radial position of the auxiliary holders 20 in adapting to various dimensions on different work by simply placing a substitutive gear 29 in lieu of the gear 23, which has a pitch dimension registering with the pitch for the gears 24. This means that rigidity in radial adjustment in the openings 16 for the auxiliary holders 20 may be had within as close range as a tooth more or less in either of the gears 23, 29, and even a more minute dimension such as a fraction of the diameter change as required for the inclusion of an additional tooth or the exclusion of a tooth may be effected by the closeness of the mesh being varied. Substitutive plate 30 for the plate 21 may be adopted as the overhang for the flange 19 becomes clear of the effective engagement for this central plate.

It is thus seen that there is a compact simple drive of maximum rigidity for a series of auxiliary spindles effective for rotation and reciprocatory from a driving source.

What is claimed and it is desired to secure by United States Letters Patent is:

1. In a multiple spindle head, a spindle sleeve, a main spindle rotatable in the sleeve, a gear housing comprising a first plate secured to an end portion of the sleeve, a second plate provided with a flange bolted to the first plate, the second plate being provided with a series of openings extending outwardly from the axis of the spindle, auxiliary spindle brackets extending through said openings and provided with slots permitting radial adjustment with respect to the main spindle, bolts in said second plate and extending through said slots to assemble the brackets with the housing, an auxiliary drill spindle journalled in each bracket, a gear removably secured on a portion of the main spindle within said housing, and a gear in the housing on an end of each auxiliary spindle and directly in mesh with said first gear, whereby said auxiliary spindles may be laterally adjusted and driven by securing gears of different diameter on said main spindle.

2. In a multiple spindle drill head, a spindle sleeve, a main spindle rotatable in the sleeve, a gear housing comprising a top plate secured to the lower portion of the sleeve, a bottom plate provided with an upwardly extending flange bolted to the top plate, the bottom plate being provided with a series of openings extending outwardly from the axis of the spindle, auxiliary spindle brackets extending through said openings and provided with slots permitting radial adjustment with respect to the main spindle, a central flanged plate engaging the brackets, bolts through the central plate and in said bottom plate and extending through said slots to assemble the brackets with the housing, an auxiliary drill spindle journalled in each bracket, a gear removably secured on the lower portion of the main spindle and within said housing, and a gear on the upper end of each auxiliary spindle and directly in mesh with said first gear whereby said auxiliary spindles may be laterally adjusted and driven by securing gears of different diameter on said main spindle.

In witness whereof I affix my signature.

HERBERT L. TIGGES.